(12) United States Patent
Shimono et al.

(10) Patent No.: US 9,631,869 B2
(45) Date of Patent: Apr. 25, 2017

(54) POWDER SUPPLY DEVICE AND POWDER SUPPLY METHOD

(75) Inventors: Kimihiro Shimono, Toyama (JP); Takahiro Takeda, Toyama (JP); Kazutoshi Teraoka, Toyama (JP); Fumihito Kasagi, Toyama (JP); Osamu Shiraishi, Fukuoka (JP); Takushi Tamamura, Tokyo (JP); Toshinori Yasutomi, Fukuoka (JP)

(73) Assignees: DIAMOND ENGINEERING CO., LTD., Toyama (JP); ELECTRIC POWER DEVELOPMENT CO., LTD., Tokyo (JP)

( * ) Notice: Subject to any disclaimer, the term of this patent is extended or adjusted under 35 U.S.C. 154(b) by 328 days.

(21) Appl. No.: 14/241,236

(22) PCT Filed: Sep. 4, 2012

(86) PCT No.: PCT/JP2012/072490
§ 371 (c)(1),
(2), (4) Date: Feb. 26, 2014

(87) PCT Pub. No.: WO2013/035701
PCT Pub. Date: Mar. 14, 2013

(65) Prior Publication Data
US 2014/0203038 A1    Jul. 24, 2014

(30) Foreign Application Priority Data

Sep. 5, 2011  (JP) ................................ 2011-192603

(51) Int. Cl.
*B65G 53/54*  (2006.01)
*F27D 3/00*  (2006.01)
(Continued)

(52) U.S. Cl.
CPC ............. *F27D 3/0033* (2013.01); *F27D 3/18* (2013.01); *G01G 11/086* (2013.01)

(58) Field of Classification Search
CPC ................................. B65G 51/16; B65G 53/54
(Continued)

(56) References Cited

U.S. PATENT DOCUMENTS 3,727,985 A *  4/1973  Reuter ................... B65G 53/66
                                                    406/124
4,410,106 A * 10/1983  Kierbow ................. G01F 11/24
                                                    222/135
(Continued)

FOREIGN PATENT DOCUMENTS

CN           201321285         10/2009
CN           101628666         1/2010
(Continued)

*Primary Examiner* — Joseph Dillon, Jr.
(74) *Attorney, Agent, or Firm* — Greenblum & Bernstein, P.L.C.

(57) ABSTRACT

A powder supply device 1 includes a powder feed pipe, at least part of which is an expansion/contraction part, a load cell, a pressure indicator, and a controller, wherein the controller obtains a powder weight or a rate of change in powder weight in the feed tank by using a value obtained by subtracting a value proportional to the pressure in the expansion/contraction part from the load applied by the feed tank to the load cell and adding a value proportional to a rate of change in pressure in the expansion/contraction part, and controls the flow rate of the powder to be fed to the outside of the feed tank by using the powder weight or the rate of change in powder weight.

10 Claims, 5 Drawing Sheets

(51) Int. Cl.
*F27D 3/18* (2006.01)
*G01G 11/08* (2006.01)

(58) Field of Classification Search
USPC ......... 406/12, 26, 27, 28, 46, 136, 137, 138, 406/144; 222/58, 195, 400.5; 431/159
See application file for complete search history.

(56) References Cited

U.S. PATENT DOCUMENTS

| | | | | |
|---|---|---|---|---|
| 4,482,275 A * | 11/1984 | Shinozaki | C21B 5/003 | 406/12 |
| 4,488,837 A * | 12/1984 | Mizokawa | G01G 11/16 | 177/16 |
| 4,490,077 A * | 12/1984 | Shimada | G01F 1/74 | 406/124 |
| 4,593,727 A * | 6/1986 | Ulveling | B65G 53/36 | 141/5 |
| 4,758,117 A * | 7/1988 | Maki | C21B 5/003 | 406/12 |
| 4,838,738 A * | 6/1989 | Salter | B01J 8/001 | 406/12 |
| 4,880,142 A * | 11/1989 | Higuchi | G01G 11/086 | 177/114 |
| 4,883,390 A * | 11/1989 | Reintjes | B65G 53/66 | 406/124 |
| 5,265,983 A * | 11/1993 | Wennerstrom | B01J 4/008 | 406/124 |
| 5,285,735 A | 2/1994 | Motoi et al. | | |
| 5,489,166 A * | 2/1996 | Schmit | B01J 8/003 | 34/360 |
| 5,497,873 A * | 3/1996 | Hay | B65D 88/66 | 198/642 |
| 5,765,728 A * | 6/1998 | Simpson | B01J 8/002 | 222/146.2 |
| 6,095,803 A * | 8/2000 | Slater | B05C 11/1042 | 222/146.2 |
| 6,176,647 B1 * | 1/2001 | Itoh | B05B 5/1683 | 406/14 |
| 6,383,301 B1 * | 5/2002 | Bell | B01J 8/0015 | 118/716 |
| 6,802,685 B1 * | 10/2004 | Federhen | B65G 53/12 | 222/442 |
| 6,823,904 B2 * | 11/2004 | Finke | B65D 88/32 | 141/317 |
| 7,075,019 B2 * | 7/2006 | Bergman | B65B 1/32 | 141/83 |
| 7,293,909 B2 * | 11/2007 | Taniguchi | B01F 1/0011 | 210/194 |
| 7,320,539 B2 * | 1/2008 | Christenson | B01F 7/022 | 366/14 |
| 7,504,593 B2 * | 3/2009 | Hanaoka | B01F 5/246 | 177/116 |
| 7,908,765 B2 * | 3/2011 | Waldron | F26B 3/08 | 264/117 |
| 8,967,919 B2 * | 3/2015 | Yaluris | C10G 11/18 | 177/1 |
| 9,296,570 B2 * | 3/2016 | Shimono | B65G 53/06 | |
| 2002/0114672 A1 * | 8/2002 | Isozaki | B65G 53/66 | 406/11 |
| 2009/0304461 A1 * | 12/2009 | Strohschein | B65G 53/54 | 406/11 |
| 2010/0017312 A1 * | 1/2010 | Evans | B01J 8/0015 | 705/28 |
| 2010/0284768 A1 * | 11/2010 | Olin-nuez | C03B 5/235 | 414/161 |
| 2011/0024266 A1 * | 2/2011 | Baumann | B65G 27/24 | 198/617 |
| 2011/0110729 A1 * | 5/2011 | Schultz | B65G 53/46 | 406/14 |
| 2012/0177451 A1 * | 7/2012 | Kvalheim | B65G 65/36 | 406/151 |
| 2013/0105521 A1 * | 5/2013 | Reddy | B67D 1/108 | 222/214 |
| 2013/0320049 A1 | 12/2013 | Shimono et al. | | |
| 2014/0030031 A1 * | 1/2014 | Stevenson | B01F 3/18 | 406/127 |
| 2014/0166439 A1 * | 6/2014 | Hughes | B65G 53/4633 | 198/530 |
| 2014/0234034 A1 * | 8/2014 | Shimono | F23K 3/02 | 406/127 |
| 2014/0270993 A1 * | 9/2014 | Stevenson | F02C 3/28 | 406/14 |
| 2015/0021358 A1 * | 1/2015 | Shimono | F23K 3/02 | 222/55 |

FOREIGN PATENT DOCUMENTS

| | | |
|---|---|---|
| JP | 57-156923 | 9/1982 |
| JP | 4-49124 | 4/1992 |
| JP | 6-115690 | 4/1994 |
| JP | 11-79395 | 3/1999 |

\* cited by examiner

| POWDER FLOW RATE SV [ℓ/h] | POWDER VALVE APERTURE [%] | DIFFERENTIAL PRESSURE [MPa] |
|---|---|---|
| 0.1 | 50 | 0.01 |
| 0.5 | 60 | 0.03 |
| 1.0 | 80 | 0.05 |
| 1.5 | 100 | 0.06 |

POWDER SUPPLY DEVICE AND POWDER SUPPLY METHOD

TECHNICAL FIELD

The present invention relates to a powder supply device and a powder supply method, and more particularly to a powder supply device and a powder supply method capable of controlling, with improved accuracy, the flow rate of powder to be fed.

BACKGROUND ART

Combustion furnaces for burning pulverized fuel such as pulverized coal fed from powder supply devices are known as combustion furnaces used in blast furnace facilities, thermal power plants, and the like. In such a combustion furnace, pulverized fuel is sprayed thereinto together with air and burnt therein. Such a burning method using pulverized coal is widely used for reasons such as the economical efficiency of coal, which is higher than those of petroleum and LPG.

A gas-carried powder supply device that conveys pulverized fuel with carrier gas is known as a powder supply device for supplying pulverized fuel to the combustion furnace. In such a powder supply device, the pulverized fuel in a feed tank is fed to a powder delivery pipe and conveyed by the carrier gas therein. In general, the supply rate of the pulverized fuel into the powder delivery pipe is controlled according to the aperture of a valve for powder provided at an outlet in a bottom portion of the feed tank and the differential pressure between the pressure in the feed tank and the pressure in the powder delivery pipe (see, for example, Patent Document 1 below).

The amount of the pulverized fuel to be fed into the powder delivery pipe is adjusted on the basis of values detected by a plurality of instruments. Examples of such instruments include a load cell (a weighing scale) that measures the weight of the feed tank. The amount of the pulverized fuel to be fed into the powder delivery pipe is adjusted with a load cell in the manner described below. The weight of the powder in the feed tank is obtained from the weight of the feed tank measured by the load cell, and the change in the weight of the powder is differentiated to obtain the rate of change in powder weight. The supply rate per unit time of the pulverized fuel fed into the powder delivery pipe is computed from this rate of change in powder weight. Then, on the basis of the result of this computation, the aperture of the valve for powder and the differential pressure between the inside of the feed tank and the powder delivery pipe are adjusted to adjust the supply rate of the powder.

From the viewpoint of the adjustment of the supply rate of the powder in this manner, it is important to correctly obtain the weight of the powder in the feed tank from a measurement taken with a load cell.

CITATION LIST

Patent Document

[Patent Document 1] Japanese Patent Application Laid-Open No. 06-115690

SUMMARY OF INVENTION

Objects to be Achieved by the Invention

The powder is fed from the inside of a pressure equalizing tank, provided above the feed tank, through a pipe into the feed tank. A bellows-like expansion/contraction part, which has alternating large and small diameters, is provided in a middle portion of this pipe. This expansion/contraction part is configured to be capable of expanding and contracting slightly in a vertical direction due to the force of the feed tank pulling the pipe. With a large amount of the powder in the feed tank and thus a heavy weight of the entire feed tank, the expansion/contraction part expands, resulting in a lower location of the feed tank. With a small amount of the powder in the feed tank and thus a relatively light weight of the entire feed tank, the expansion/contraction part expands less, resulting in a relatively upper location of the feed tank. Such a vertical shift of the feed tank by the length of the expansion of the expansion/contraction part allows the load cell to detect the weight of the entire feed tank.

When the pressure in the feed tank is very high, however, the expansion/contraction part tends to experience expansion due to its own inner pressure in addition to the expansion due to the pulling of the feed tank because the inside of the expansion/contraction part, which is part of the pipe connecting the feed tank to the pressure equalizing tank, has a similar pressure to the inside of the feed tank. The expansion of the expansion/contraction part due to its own inner pressure causes the expansion/contraction part to, through the pipe, push the feed tank downward. In this case, the load cell detects a heavier weight of the entire feed tank than the actual weight of the feed tank. If the supply rate per unit time of the pulverized fuel fed into the powder delivery pipe is obtained on the basis of such an output from the load cell, a wrong value may be output. This may affect the adjustment of the aperture of the valve for powder and the differential pressure between the inside of the feed tank and the powder delivery pipe, preventing an accurate control of the flow rate of the powder to be fed.

It is therefore an object of the present invention to provide a powder supply device and a powder supply method capable of controlling, with improved accuracy, the flow rate of powder to be fed.

Means for Achieving the Objects

To achieve the aforementioned object, the present inventors have expended diligent efforts so that the weight of the powder in the feed tank can be obtained with accuracy on the basis of a value output by the load cell. The inventors have subtracted a force with which the expansion/contraction part pushes the feed tank downward when the expansion/contraction part expands due to its own inner pressure from a load which is applied by the feed tank to the load cell and is output by the load cell. The force with which the expansion/contraction part expands due to its own inner pressure is a value proportional to the pressure in the expansion/contraction part, and specifically, it is a value proportional to the product of the area of the aperture of the expansion/contraction part at its lower end and the pressure in the expansion/contraction part. This value has been subtracted from the value output by the load cell. This is because the inventors have thought that the weight of the powder in the feed tank could be obtained accurately in this manner. The inventors, however, have found that, by subtracting the force with which the expansion/contraction part pushes the feed tank, the weight of the powder in the feed tank could not be obtained accurately in some cases in which the pressure in the expansion/contraction part changes. Thus, the present inventors have further expended diligent efforts to achieve the present invention.

The present invention provides a powder supply device for supplying powder in a feed tank to an outside of the feed tank, the system including: a powder feed pipe, at least part of which is an expansion/contraction part that expands and contracts in a vertical direction, the powder feed pipe being connected to a top portion of the feed tank and configured to feed the powder into the feed tank; a load cell configured to receive a load from the feed tank to detect the load; a pressure indicator configured to detect a pressure in the expansion/contraction part; and a controller, wherein the controller obtains a powder weight or a rate of change in powder weight in the feed tank by using a value obtained by performing a subtraction of a value proportional to the pressure in the expansion/contraction part detected by the pressure indicator from the load detected by the load cell and an addition of a value proportional to a rate of change in pressure in the expansion/contraction part, and controls a flow rate of the powder to be fed to the outside of the feed tank by using the powder weight or the rate of change in powder weight.

Additionally, the present invention provides a powder supply method for supplying powder in a feed tank to an outside of the feed tank, the method including the steps of: supplying the powder into the feed tank from a powder feed pipe at least part of which is an expansion/contraction part that expands and contracts in a vertical direction, the powder feed pipe being connected to a top portion of the feed tank; calculating a powder weight or a rate of change in powder weight in the feed tank by using a value obtained by performing a subtraction of a value proportional to a pressure in the expansion/contraction part from a load detected by a load cell that receives the load from the feed tank and an addition of a value proportional to a rate of change in pressure in the expansion/contraction part; and controlling a flow rate of the powder to be fed to the outside of the feed tank by using the powder weight or the rate of change in powder weight.

The present inventors have found that, by subtracting the force with which the expansion/contraction part pushes the feed tank downward when the expansion/contraction part expands due to its own inner pressure from the load which is applied by the feed tank to the load cell in order to obtain the weight of the powder in the feed tank, an error proportional to the rate of change in pressure in the expansion/contraction part is produced in cases in which the pressure in the expansion/contraction part changes. A typical example of cases in which the pressure in the expansion/contraction part changes is a case in which the pressure in the feed tank changes. This is because the expansion/contraction part is provided in the powder feed pipe connected to the feed tank, and thus the insides of the expansion/contraction part and the feed tank are spatially connected to each other. Although the cause of such an error remains uncertain, the present inventors have found that this error is a negative value with the pressure in the expansion/contraction part increasing and a positive value with the pressure in the expansion/contraction part decreasing, and the magnitude of the error is a value approximately proportional to the rate of change in pressure in the expansion/contraction part. A conclusion has been reached that, in the present invention, the powder weight or the rate of change in powder weight in the feed tank can be obtained by using a value obtained by subtracting the force with which the expansion/contraction part pushes the feed tank downward when the expansion/contraction part expands due to its own inner pressure (a value proportional to the pressure in the expansion/contraction part) from the load applied by the feed tank to the load cell and adding a force proportional to the rate of change in pressure in the expansion/contraction part. By obtaining the powder weight or the rate of change in powder weight in the feed tank in this manner, the error described above can be reduced even when the pressure in the expansion/contraction part changes, and thus the powder weight or the rate of change in powder weight in the feed tank can be obtained accurately. The flow rate of the powder to be fed to the outside of the feed tank is controlled on the basis of the powder weight or the rate of change in powder weight in the feed tank obtained accurately as described above, and thus the flow rate of the powder to be fed can be controlled with improved accuracy.

It is preferable that the powder supply device described above further includes a displacement gauge configured to detect an amount of expansion/contraction of the expansion/contraction part, wherein the controller obtains the powder weight or the rate of change in powder weight in the feed tank by using a value obtained by performing the subtraction of a value proportional to the pressure in the expansion/contraction part detected by the pressure indicator from the load detected by the load cell, an addition of a value proportional to the rate of change in pressure in the expansion/contraction part, and a subtraction of a value proportional to the amount of expansion/contraction.

It is preferable that, in the powder supply method described above, the calculating of the powder weight or the rate of change in powder weight in the feed tank uses a value obtained by performing the subtraction of a value proportional to the pressure in the expansion/contraction part from a load detected by the load cell that receives the load from the feed tank, the addition of a value proportional to the rate of change in pressure in the expansion/contraction part, and a subtraction of a value proportional to an amount of expansion/contraction of the expansion/contraction part.

The expansion/contraction part may expand and contract due to influence of heat and the like in addition to the inner pressure described above. Consequently, by further subtracting the value proportional to the amount of expansion/contraction of the expansion/contraction part, influence of expansion of the expansion/contraction part due to heat and the like can be eliminated, and thus the powder weight or the rate of change in powder weight can be obtained with improved accuracy.

Additionally, it is preferable that, in the powder supply device described above, the controller controls the flow rate of the powder to be fed to the outside of the feed tank by using a value obtained by subjecting the powder weight or the rate of change in powder weight, which has been obtained, to at least one of primary delay processing and moving average processing.

Additionally, it is preferable that, in the powder supply method described above, the controlling of the flow rate of the powder to be fed to the outside of the feed tank uses a value obtained by subjecting the powder weight or the rate of change in powder weight, which has been obtained, to at least one of primary delay processing and moving average processing.

In a case in which the pressure of the expansion/contraction part changes, there is a time lag from a change in the pressure to the pushing of the feed tank by the powder feed pipe. In other words, with a change in pressure in the expansion/contraction part as an input and the force with which the powder feed pipe pushes the feed tank as an output, there is a time lag between the input and the output. This time lag gives an error in the powder weight and the rate of change in powder weight to be obtained. Additionally, an error of an instrument, an unexpected reason, or the like may cause an abnormal error in powder weight and in rate of change in powder weight. By subjecting an obtained value of the powder weight or the rate of change in powder weight to the primary delay processing and the moving average processing, a steep rise or fall of an error in powder weight or in rate of change in powder weight can be alleviated to further reduce the error. Thus, the flow rate of the powder to be fed to the outside of the feed tank can be controlled with further accuracy.

Additionally, in the powder supply device described above, the pressure indicator may detect a pressure in the feed tank as the pressure in the expansion/contraction part, and, in the powder supply method described above, the calculating may be performed by using a pressure in the feed tank as the pressure in the expansion/contraction part.

The expansion/contraction part is provided in the powder feed pipe connected to the feed tank, and thus the insides of the expansion/contraction part and the feed tank are spatially connected to each other. Thus, the pressure in the feed tank and the pressure in the expansion/contraction part are similar to each other. The feed tank is in general provided with a pressure indicator, which can detect the pressure in the feed tank to use the detected pressure as the pressure in the expansion/contraction part. This eliminates a pressure indicator in the expansion/contraction part, simplifying the arrangement.

Effect of Invention

As described above, the present invention provides a powder supply device and a powder supply method capable of controlling, with improved accuracy, the flow rate of powder to be fed.

DESCRIPTION OF EMBODIMENTS

Some preferred embodiments of a powder supply device and a powder supply method according to the present invention will be described in detail below with reference to the drawings.

First Embodiment

Arrangement of Powder Supply Device 1

Figure 1:
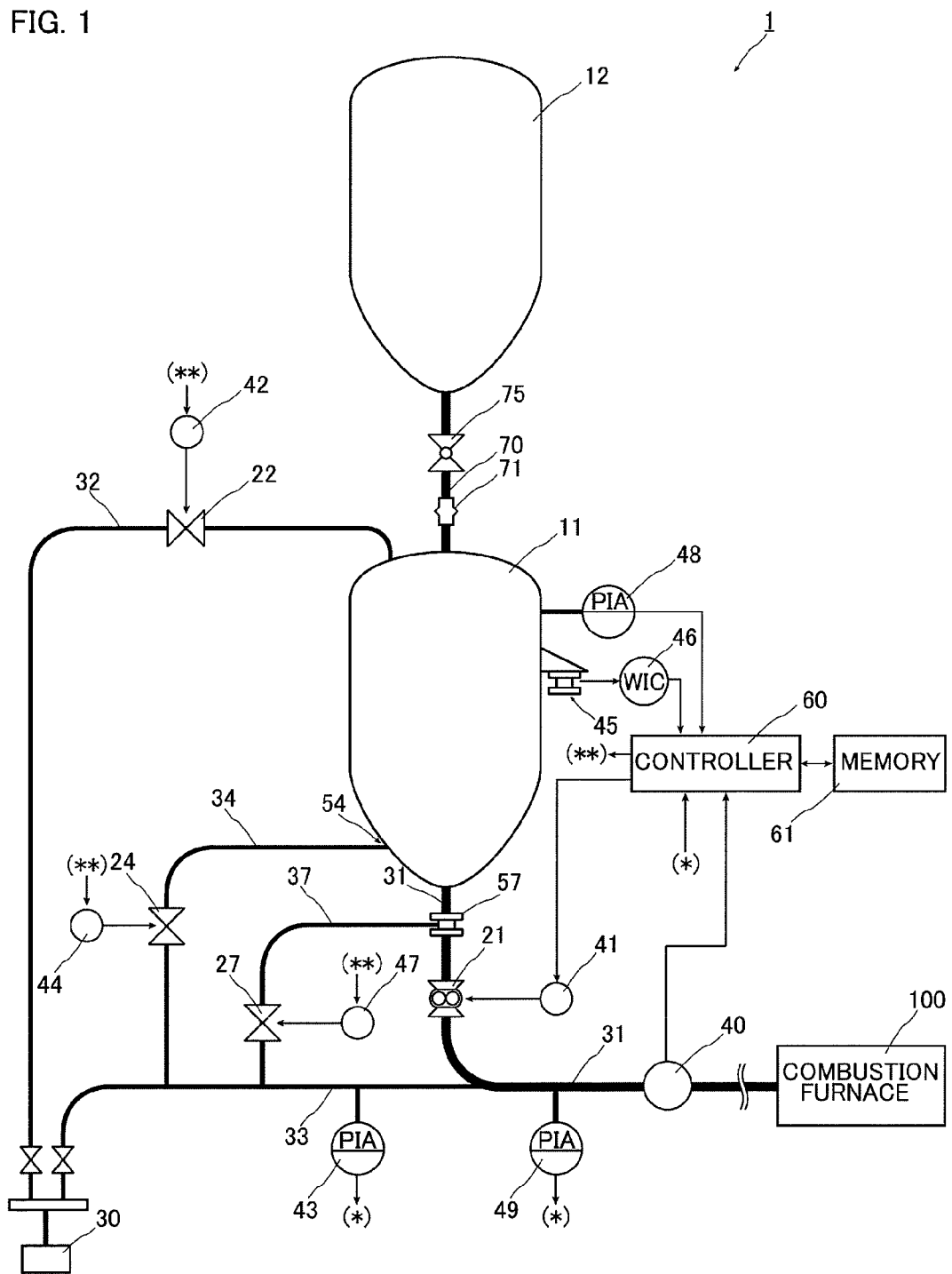
FIG. 1 is a diagram of a powder supply device according to a first embodiment of the present invention.

FIG. 1 is a diagram of a powder supply device according to a first embodiment of the present invention.

As illustrated in FIG. 1, a powder supply device 1 includes a feed tank 11 for supplying a predetermined amount of pulverized fuel such as pulverized coal, a pressure equalizing tank 12 in which the pulverized fuel to be fed to the feed tank 11 is stored, a powder feed pipe 70 for supplying the pulverized fuel in the pressure equalizing tank 12 to the feed tank 11, an internal pressure gas supply pipe 32 connected to the feed tank 11 and configured to convey gas for internal pressure to be supplied into the feed tank 11, a powder delivery pipe 31 connected to the feed tank 11 and configured to convey the pulverized fuel fed from the feed tank 11, a valve 21 for powder connected to the powder delivery pipe 31 and configured to adjust the amount of the pulverized fuel fed from the feed tank 11, and a carrier gas main pipe 33 connected to the powder delivery pipe 31 and configured to introduce carrier gas to the powder delivery pipe 31.

The feed tank 11 and the pressure equalizing tank 12 are metallic tanks. The feed tank 11 is positioned below the pressure equalizing tank 12, with the powder feed pipe 70 connected at one end thereof to a bottom portion of the pressure equalizing tank 12 and at another end thereof to a top portion of the feed tank 11. Furthermore, the powder feed pipe 70 is provided with a powder feed valve 75 in a middle portion thereof, and supplying of the pulverized fuel from the pressure equalizing tank 12 to the feed tank 11 is controlled by opening and closing of the powder feed valve 75. An expansion/contraction part 71, which expands and contracts in a vertical direction, is provided below the powder feed valve 75 in the powder feed pipe 70, and the inside of the feed tank 11 and the inside of the expansion/contraction part 71 of the powder feed pipe 70 are spatially connected to each other.

Figures 2, 3:
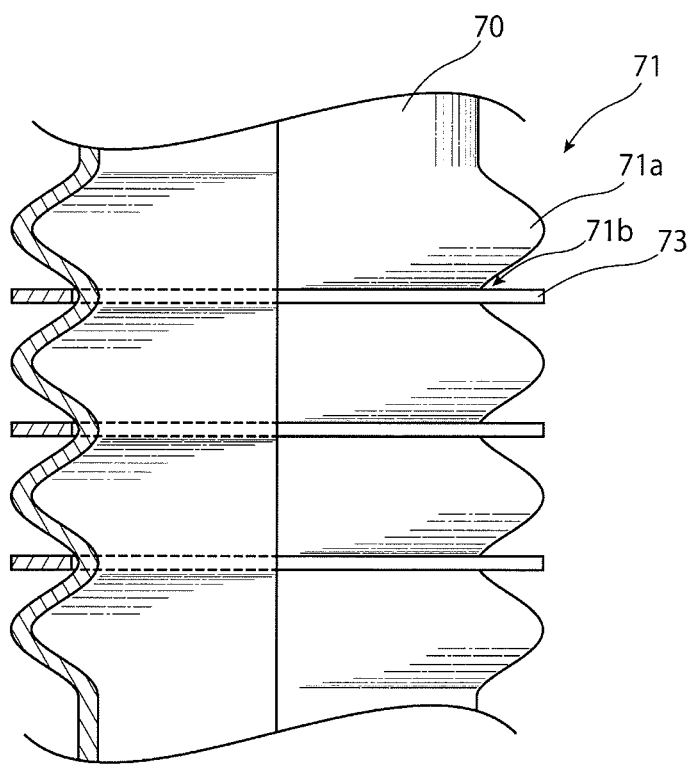
FIG. 2 is a partial view of a powder feed pipe.
FIG. 3 is a partial schematic example of information in a memory.
Figure 4:
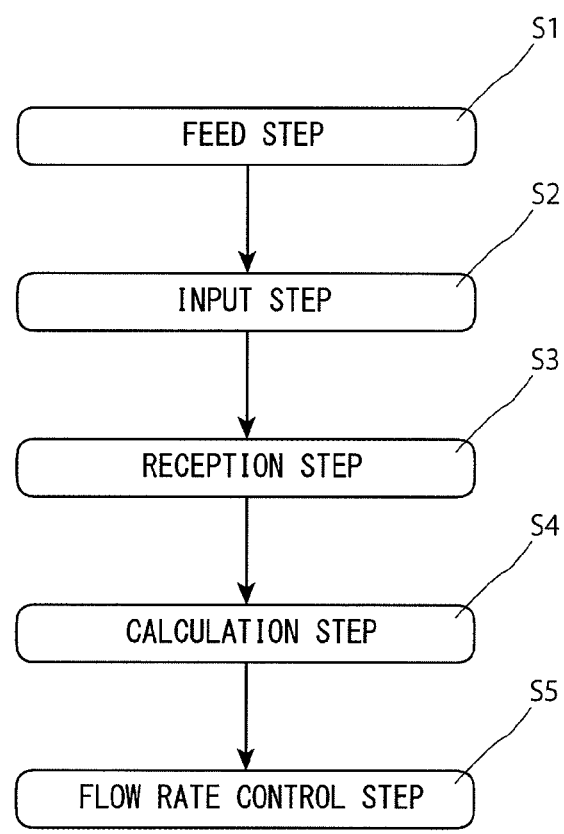
FIG. 4 is a flowchart of an operation of the powder supply device.

FIG. 2 is a partial view of the powder feed pipe 70, in which an arrangement of the expansion/contraction part 71 is illustrated in particular. The right half in FIG. 2 is an external view of the expansion/contraction part 71, and the left half is a sectional view of the expansion/contraction part 71, in which its arrangement is illustrated. As illustrated in FIG. 2, the expansion/contraction part 71 has alternating large diameter portions 71a having large diameters and small diameter portions 71b having small diameters, so that the powder feed pipe 70 has a bellows-like external shape. With such an arrangement, the expansion/contraction part 71 can expand and contract in a longitudinal direction of the powder feed pipe 70. Since the powder feed pipe 70 is placed with its longitudinal direction along the vertical direction, the expansion/contraction part expands and contracts in the vertical direction as described above.

Metallic rings 73 are provided on the outer circumferential surfaces of the small diameter portions 71b. These rings 73 preclude excessive growth in diameter of the small diameter portions 71b, thereby preventing the expansion/contraction part 71 from bulging radially.

A load cell 45 is connected to the feed tank 11, and is configured to continuously detect a load applied by the feed tank 11 to the load cell 45. In other words, with a high flow rate of the pulverized fuel in the feed tank 11, the entire weight of the feed tank 11 increases, allowing the expansion/contraction part 71 of the powder feed pipe 70 to expand to shift the feed tank 11 to a lower position. This enables the load cell 45 to detect the load applied by the feed tank 11. A weight indicator/controller (WIC) 46 is connected to the load cell 45, and is configured to output signals including a detection signal output by the load cell 45.

Furthermore, a pressure indicator 48 is connected to the feed tank 11, and is configured to detect the pressure in the feed tank 11 and output a signal containing information based on the pressure in the feed tank 11. The insides of the feed tank 11 and the expansion/contraction part 71 are spatially connected to each other as described above, and thus, the pressures in the feed tank 11 and the expansion/contraction part 71 are similar to each other. Hence, the pressure indicator 48 can detect the pressure in the feed tank 11 to thereby detect the pressure in the expansion/contraction part 71. In other words, the pressure indicator 48 can detect the pressure in the feed tank 11 as the pressure in the expansion/contraction part 71.

In addition, the powder delivery pipe 31 is connected to a bottom portion of the feed tank 11. The pulverized fuel fed from the feed tank 11 is introduced into the powder delivery pipe 31 from the feed tank 11 and conveyed by the powder delivery pipe 31 as described above.

The valve 21 for powder is connected to a middle portion of the powder delivery pipe 31 as described above. Accordingly, the pulverized fuel fed from the feed tank 11 is conveyed by the powder delivery pipe 31 via the valve 21 for powder.

The valve 21 for powder is a ball valve made of a sphere in which a throughhole having a predetermined inner diameter is formed, a rotatable control valve made of a set of cylinders each having a notch in a side face thereof, and the like, the cylinders being arranged in a manner that the side faces are in contact with each other. The amount of the pulverized fuel fed from the feed tank 11 can be adjusted by adjusting the aperture of the valve 21 for powder. Since the valve 21 for powder is a valve through which the pulverized fuel passes, the valve 21 for powder can control the flow rate of the pulverized fuel directly. It is thus possible to change the powder flow rate greatly within a short time by adjusting the aperture of the valve for powder. Furthermore, a powder valve indicator 41 is connected to the valve 21 for powder, and is configured to adjust the aperture of the valve 21 for powder.

As described above, the internal pressure gas supply pipe 32 to supply internal pressure gas for adjusting the pressure in the feed tank 11 is connected to the feed tank 11, and the internal pressure control valve 22 is provided in the internal pressure gas supply pipe 32. The amount of the internal pressure gas supplied to the feed tank 11 is adjusted by adjusting the aperture of the internal pressure control valve 22. Furthermore, an internal pressure control valve indicator 42 is connected to the internal pressure control valve 22, and is configured to adjust the aperture of the internal pressure control valve 22. The internal pressure adjustment valve 22 preferably has a function of an exhaust valve that releases the gas in the feed tank 11 to the outside. Alternatively, the feed tank 11 may be provided with an undepicted exhaust pipe, which may include an exhaust valve configured, as a second internal pressure adjustment valve, to be capable of releasing unwanted gas in the feed tank 11 to the outside.

A gas generator 30 is connected to one end of the internal pressure gas supply pipe 32 opposite to the end thereof on the side of the feed tank 11. Part of gas output from the gas generator 30 is introduced into the internal pressure gas supply pipe 32 and used as the internal pressure gas.

The carrier gas main pipe 33 is also connected to the gas generator 30. The carrier gas main pipe 33 is a pipe for introducing the carrier gas for conveying the pulverized fuel into the powder delivery pipe 31. Thus, an end of the carrier gas main pipe 33 opposite to that on the side of the gas generator 30 is connected to the powder delivery pipe 31 described above at a position opposite to the feed tank 11 with respect to the valve 21 for powder. The pulverized fuel introduced into the powder delivery pipe 31 from the feed tank 11 via the valve 21 for powder is conveyed by the carrier gas introduced into the powder delivery pipe 31 from the carrier gas main pipe 33. Furthermore, a pressure indicator 43 is connected to the carrier gas main pipe 33, and is configured to detect the pressure in the carrier gas main pipe 33 and output a signal based on the pressure in the carrier gas main pipe 33.

As described above, a part of the gas output from the gas generator 30 is introduced to the internal pressure gas supply pipe 32, and another part of the gas output from the gas generator 30 is introduced into the carrier gas main pipe 33. That is, the internal pressure gas and the carrier gas are the same gas species in the present embodiment.

Furthermore, the fluidizing gas pipe 34 is branched off from the carrier gas main pipe 33, and an end of the fluidizing gas pipe 34 opposite to that on the side of the branch point at the carrier gas main pipe 33 is connected to the bottom portion of the feed tank 11. In the present embodiment, the portion where the fluidizing gas pipe 34 is connected to the feed tank 11 is the powder fluidizing portion 54. Part of the carrier gas flowing through the carrier gas main pipe 33 is introduced as fluidizing gas into the fluidizing gas pipe 34, and the fluidizing gas is introduced into the feed tank 11 from below via the powder fluidizing portion 54. Since part of the carrier gas is used as the fluidizing gas as described above, the fluidizing gas and the carrier gas are the same gas species in the present embodiment. Furthermore, the fluidizing gas valve 24 is provided in a middle portion of the fluidizing gas pipe 34, and the amount of the fluidizing gas introduced into the feed tank 11 is adjusted by adjusting the aperture of the fluidizing gas valve 24. Furthermore, a fluidizing gas valve indicator 44 is connected to the fluidizing gas valve 24, and is configured to adjust the aperture of the fluidizing gas valve 24.

In addition, a refluidizing gas pipe 37 is branched off from the carrier gas main pipe 33 at a position different from the position from which the fluidizing gas pipe 34 is branched off, and an end of the refluidizing gas pipe 37 opposite to that on the side of the branch point at the carrier gas main pipe 33 is connected to a portion of the powder delivery pipe 31 between the valve 21 for powder and the powder fluidizing portion 54. In the present embodiment, the portion where the refluidizing gas pipe 37 is connected between the valve 21 for powder and the powder fluidizing portion 54 is the powder refluidizing portion 57, from which the refluidizing gas is introduced into the powder delivery pipe 31. Although the powder refluidizing portion 57 and the valve 21 for powder are connected by the powder delivery pipe 31 in FIG. 1, the powder refluidizing portion 57 is preferably connected directly to the valve 21 for powder. In this manner, part of the carrier gas flowing through the carrier gas main pipe 33 is introduced as the refluidizing gas into the refluidizing gas pipe 37, and the refluidizing gas is introduced between the valve 21 for powder and the powder fluidizing portion 54 via the powder refluidizing portion 57. As described above, the refluidizing gas pipe 37 is branched off from the carrier gas main pipe 33, and the refluidizing gas and the carrier gas are the same gas species. Thus, all of the fluidizing gas, the refluidizing gas, and the carrier gas are the same gas species. Furthermore, the refluidizing gas valve 27 is provided in a middle portion of the refluidizing gas pipe 37, and the amount of the refluidizing gas introduced is adjusted by adjusting the aperture of the refluidizing gas valve 27. Furthermore, a refluidizing gas valve indicator 47 is connected to the refluidizing gas valve 27, and is configured to adjust the aperture of the refluidizing gas valve 27.

In addition, a pressure indicator 49 is connected to a portion of the powder delivery pipe 31 where the pulverized fuel is conveyed by the carrier gas, that is, a portion downstream of the position at the powder delivery pipe 31 to which the carrier gas main pipe 33 is connected, and is configured to detect the pressure in the powder delivery pipe 31 and output a signal containing information based on the pressure in the powder delivery pipe 31. A powder flowmeter 40 is further provided in the portion of the powder delivery pipe 31 where the pulverized fuel is conveyed by the carrier gas, and is configured to detect the flow rate of powder flowing through the powder delivery pipe 31 and output a signal containing the detected information.

In such a powder supply device, the pressure in the feed tank 11 is higher than the pressure in the carrier gas main pipe 33, and the pressure in the carrier gas main pipe 33 is higher than the pressure in the powder delivery pipe 31. The powder supply device 1 is configured to convey the pulverized fuel by utilizing the differential pressures between these pressures. These pressures are not particularly limited, but may be in a range of 2 MPa to 4 MPa, for example.

The differential pressure between the pressure in the feed tank 11 and the pressure in the carrier gas main pipe 33, the differential pressure between the pressure in the carrier gas main pipe 33 and the pressure in the powder delivery pipe 31, and the differential pressure between the pressure in the feed tank 11 and the pressure in the powder delivery pipe 31 can thus be adjusted by adjusting the pressure in the feed tank 11. Since the powder supply device 1 conveys the pulverized fuel by utilizing the differential pressures as described above, the flow rate of the pulverized fuel fed from the feed tank 11 can be also adjusted by the differential pressures in addition to the aperture of the valve 21 for powder described above. In other words, the differential pressures can be adjusted by adjusting the pressure in the feed tank 11 with the aperture of the internal pressure control valve 22, and the flow rate of the pulverized fuel fed from the feed tank 11 can thus be adjusted. When the flow rate of the pulverized fuel is adjusted by controlling the differential pressures in this manner, the powder flow rate can be finely adjusted.

The powder supply device 1 further includes a controller 60 connected to a memory 61. The controller 60 is connected to the powder flowmeter 40, the pressure indicators 43, 48, and 49, and the weight indicator/controller 46, and receives as input a signal containing information on the powder flow rate output from the powder flowmeter 40, a signal containing information on the pressure in the carrier gas main pipe 33 output from the pressure indicator 43, a signal containing information on the pressure in the feed tank 11 output from the pressure indicator 48, a signal containing information on the pressure in the powder delivery pipe 31 output from the pressure indicator 49, a signal containing information on the load applied to the load cell 45 by the feed tank 11 output from the weight indicator/controller 46, and the like.

The controller 60 generates control signals on the basis of the signal output from the weight indicator/controller 46 and also, as necessary, on the basis of the signals from the pressure indicators 43, 48, and 49, information in the memory 61, and the signal from the powder flowmeter 40. The controller 60 is also connected to the powder valve indicator 41, the internal pressure control valve indicator 42, the fluidizing gas valve indicator 44, and the refluidizing gas valve indicator 47, and is configured to input the generated control signals to the powder valve indicator 41, the internal pressure control valve indicator 42, the fluidizing gas valve indicator 44, and the refluidizing gas valve indicator 47.

The powder valve indicator 41 is configured to adjust the aperture of the valve 21 for powder on the basis of a control signal from the controller 60. Furthermore, the internal pressure control valve indicator 42 is configured to adjust the aperture of the internal pressure control valve 22 on the basis of a control signal from the controller 60. Furthermore, the fluidizing gas valve indicator 44 is configured to adjust the aperture of the fluidizing gas valve 24 on the basis of a control signal from the controller 60. Furthermore, the refluidizing gas valve indicator 47 is configured to adjust the aperture of the refluidizing gas valve 27 on the basis of a control signal from the controller 60.

FIG. 3 is a partial schematic example of the information in the memory 61. In this example, a schematic table is provided to indicate the relationship of the powder flow rate, the aperture of the valve 21 for powder, and the differential pressure between the pressure in the carrier gas main pipe 33 and the pressure in the powder delivery pipe 31. As illustrated in FIG. 2, when a powder flow rate [l/h] is specified, its relationship with an aperture [%] of the valve 21 for powder and a differential pressure [MPa] corresponding to the powder flow rate is specified. For example, with the powder flow rate at 0.5 [l/h], the aperture of the valve 21 for powder is at 60[%], and the differential pressure is at 0.03 [MPa]. A control signal for adjusting the aperture of the valve 21 for powder is generated by the controller 60 on the basis of the information indicating the aperture of the valve 21 for powder from the memory 61, and input to the powder valve indicator 41. Once the differential pressure between the pressure in the carrier gas main pipe 33 and the pressure in the powder delivery pipe 31 is specified, a control signal for adjusting the aperture of the internal pressure control valve 22 is generated by the controller 60 on the basis of the information from the pressure indicators 43 and 49 and information indicating the differential pressure from the memory 61, and this control signal is input into the internal pressure control valve indicator 42. Note that such a table in the memory 61 is obtained in advance through experiments or the like and recorded in the memory 61. Although the differential pressure between the pressure in the carrier gas main pipe 33 and the pressure in the powder delivery pipe 31 is used in this example, the differential pressure between the pressure in the feed tank 11 and the pressure in the carrier gas main pipe 33 or the differential pressure between the pressure in the feed tank 11 and the pressure in the powder delivery pipe 31 may be recorded in the memory 61 for use in the generation of the control signal.

In the powder supply device 1, the powder delivery pipe 31 is directly or indirectly connected to a combustion furnace 100 for burning the pulverized fuel to extract energy.

<<Operation of Powder Supply Device 1>>

An operation of the powder supply device 1 and a method of adjusting the powder flow rate of the pulverized fuel by using the powder supply device 1 will now be described.

FIG. 3 is a flowchart of an operation of the powder supply device 1. As illustrated in FIG. 3, an operation of the powder supply device 1 includes feed step S1 for supplying the powder from the powder feed pipe 70 into the feed tank 11, input step S2 for inputting information of the desired powder flow rate, reception step S3 for receiving by the controller 60 a signal from the weight indicator/controller 46, calculation step S4 for obtaining a rate of change in powder weight in the feed tank 11, and flow rate control step S5 for controlling the flow rate of the powder to be fed to the outside of the feed tank 11 on the basis of the rate of change in powder weight in the feed tank 11.

<Feed Step S1>

The powder feed valve 75 is opened to feed the pulverized fuel stored in the pressure equalizing tank 12 from the powder feed pipe 70 to the feed tank 11.

The fluidizing gas valve 24 is also opened to introduce the fluidizing gas from the fluidizing gas pipe 34 via the powder fluidizing portion 54 into the feed tank 11 for fluidizing the pulverized fuel in the feed tank 11 so that the pulverized fuel is fed from the feed tank 11 to the powder delivery pipe 31 via the valve 21 for powder. This facilitates supplying the pulverized fuel from the feed tank 11.

<Input Step S2>

Then, information on a set value SV of the powder flow rate is input by an operator through input means. Note that the input means is not shown in FIG. 1. The information that has been input is input into the controller 60.

Upon receipt of the information from the input means, the controller 60 references the memory 61 to read out an aperture of the valve 21 for powder and a differential pressure between the pressure in the carrier gas main pipe 33 and the pressure in the powder delivery pipe 31. The aperture and the differential pressure correspond to the input information on the set value SV of the powder flow rate. The controller 60 then generates a control signal on the initial aperture of the valve 21 for powder, and transmits the control signal to the powder valve indicator 41. The powder valve indicator 41, which has received the control signal, adjusts the aperture of the valve 21 for powder on the basis of the control signal from the controller 60. In this manner, the initial aperture of the valve 21 for powder is adjusted on the basis of the information from the memory 61. Note that the fluidizing of the pulverized fuel by the fluidizing gas described above may be started after the input of the information into the input means as long as the fluidizing is done before the valve 21 for powder is opened.

With the aperture of the valve 21 for powder adjusted, the refluidizing gas is introduced. In a case in which the amount of the introduced refluidizing gas is determined on the basis of the aperture of the valve 21 for powder, as the aperture of the valve 21 for powder increases, the aperture of the refluidizing gas valve 27 becomes smaller according to the control signal from the controller 60 and the amount of the introduced refluidizing gas becomes smaller. In other words, the amount of the introduced refluidizing gas is controlled in inverse proportion to the aperture of the valve 21 for powder in this case. This is due to the following reason. Obstruction by the pulverized fuel is likely to occur when the aperture of the valve 21 for powder is small while obstruction by the pulverized fuel is less likely to occur when the aperture of the valve 21 for powder is large. Accordingly, in a state in which the aperture of the valve 21 for powder is small where obstruction by the pulverized fuel is likely to occur, the amount of the introduced refluidizing gas is increased, while in a state in which the aperture of the valve 21 for powder is large where the obstruction by the pulverized fuel is less likely to occur, the amount of the introduced refluidizing gas is decreased. In this manner, it is possible to prevent an unnecessarily large amount of refluidizing gas from being introduced by determining the amount of the introduced refluidizing gas on the basis of the aperture of the valve for powder.

As described above, the powder refluidizing portion 57 is provided at a portion of the powder delivery pipe 31 between the powder fluidizing portion 54 and the valve 21 for powder. Even in a case in which the pulverized fuel is fluidized by the fluidizing gas, the fluidity of the pulverized fuel is lowered when the pulverized fuel enters the powder delivery pipe 31 from the feed tank 11, and obstruction becomes likely to occur in the valve 21 for powder. In a case in which the pulverized fuel is refluidized in the powder delivery pipe 31, however, it is possible to prevent the valve 21 for powder from being obstructed. In a case in which the powder refluidizing portion 57 is connected to the valve 21 for powder as described above, the pulverized fuel is refluidized immediately above the valve 21 for powder, which can further prevent the valve 21 for powder from being obstructed.

Furthermore, the controller 60 generates a control signal on the aperture of the internal pressure control valve 22 on the basis of the information in the memory 61 and the information from the pressure indicators 43 and 49 and transmits the control signal to the internal pressure control valve indicator 42. The internal pressure control valve indicator 42 adjusts the initial aperture of the internal pressure control valve 22 on the basis of the control signal from the controller 60. As a result of adjusting the aperture of the internal pressure control valve 22, the pressure in the feed tank 11 is adjusted to achieve a predetermined value, bringing the differential pressure between the pressure in the carrier gas main pipe 33 and the pressure in the powder delivery pipe 31 into a predetermined range. Although the pressure in the feed tank 11 is adjusted to bring the differential pressure between the pressure in the carrier gas main pipe 33 and the pressure in the powder delivery pipe 31 into a predetermined range in this example, the pressure in the feed tank 11 may be adjusted to bring the differential pressure between the pressure in the feed tank 11 and the pressure in the carrier gas main pipe 33 or the differential pressure between the pressure in the feed tank 11 and the pressure in the powder delivery pipe 31 into the predetermined range.

<Reception Step S3>

The load cell 45 connected to the feed tank 11 outputs a signal on the load applied by the feed tank 11 to the load cell 45, and this signal is input into the weight indicator/controller 46, which in turn outputs a signal containing information on the load applied by the feed tank 11 to the load cell 45. The signal output from the feed tank 11 is input into and received by the controller 60.

The pressure indicator 48 connected to the feed tank 11 detects the pressure in the feed tank 11 and outputs a signal containing information on the pressure in the feed tank 11. This signal is input into and received by the controller 60. The pressure in the feed tank 11 is similar to the pressure in the expansion/contraction part 71 of the powder feed pipe 70 as described above. Hence, the pressure indicator 48 detects and outputs the pressure in the feed tank 11 to thereby detect and output the pressure in the expansion/contraction part 71.

In other words, the output from the load cell 45, to which the load is applied by the feed tank 11, and the output from the pressure indicator 48, which detects the pressure in the feed tank 11 as the pressure in the expansion/contraction part 71, are received by the controller 60 in this step.

<Calculation Step S4>

The controller 60 then uses the load, which is applied by the feed tank 11 to the load cell 45 and received from the load cell 45, and the pressure in the feed tank 11, which is received from the pressure indicator 48, to obtain the rate of change in weight of the pulverized fuel in the feed tank 11 through computation.

The load applied by the feed tank 11 to the load cell 45 includes the weight of the feed tank 11, the weight of the pulverized fuel in the feed tank 11, and a force with which the powder feed pipe 70 pushes the feed tank 11.

The weight of the feed tank 11 does not change and thus may be measured and input into the memory 60 in advance.

The force with which the powder feed pipe 70 pushes the feed tank 11 is, in principle, a value proportional to the product of the area of the aperture of the expansion/contraction part 71 at its lower end and the pressure in the expansion/contraction part 71, and, since the area of the aperture does not change, the force with which the powder feed pipe 70 pushes the feed tank 11 can be defined as a value proportional to the pressure in the expansion/contraction part 71. The area of the aperture of the expansion/contraction part 71 at its lower end does not change and thus may be measured and input into the memory 60 in advance. The pressure in the expansion/contraction part 71 is similar to the pressure in the feed tank 11, which is spatially connected to the expansion/contraction part 71, as described above, and thus a signal from the pressure indicator 48, which detects the pressure in the feed tank 11 as the pressure in the expansion/contraction part 71, may be used. When the pressure in the feed tank 11 changes, however, the pressure in the expansion/contraction part 71 also changes, which produces an error in the force with which the powder feed pipe 70 pushes the feed tank 11, according to the findings of the present inventors.

This error is a negative value with the pressure in the expansion/contraction part increasing and a positive value with the pressure in the expansion/contraction part decreasing, and the magnitude of the error is a value approximately proportional to the rate of change in pressure in the expansion/contraction part, according to the findings of the present inventors. Hence, in consideration of a case in which the pressure in the feed tank 11 changes, the force with which the powder feed pipe 70 pushes the feed tank 11 includes the value proportional to the pressure in the expansion/contraction part 71 and a value proportional to the rate of change in pressure in the expansion/contraction part 71.

The controller 60 thus obtains the rate of change in weight of the pulverized fuel in the feed tank 11 by using a value obtained by subtracting the value proportional to the pressure in the expansion/contraction part 71 detected by the pressure indicator 48 from the load applied by the feed tank 11 to the load cell 45, adding a value obtained by the subtraction to the value proportional to the rate of change in pressure in the expansion/contraction part 71, and then subtracting the weight of the feed tank 11, etc. from a value obtained by the addition. Specifically, with the load applied by the feed tank 11 to the load cell 45 defined as Wo, the area of the aperture of the expansion/contraction part 71 at its lower end defined as A, and the pressure in the expansion/contraction part 71 defined as P, the weight $W_1$ of the pulverized fuel in the feed tank 11 may be described as in expression (1) below. Note that, in expression (1) described below, as the value proportional to the pressure in the expansion/contraction part 71, the pressure in the expansion/contraction part 71 is multiplied by the area of the aperture of the expansion/contraction part 71 at its lower end and a constant of proportionality.

$$W_1 = W_O - KAP + \alpha + K'\frac{dP}{dt} \quad (1)$$

where K is a correction factor to correct the force obtained by the multiplication of the pressure in the expansion/contraction part 71 and the area of the expansion/contraction part 71 at its lower end to a value in the system of units for a value output by the load cell, and it is a positive coefficient of proportionality. Additionally, K' is a correction factor to correct a derivative of the pressure to a value in the system of units for the force, and it is a positive coefficient of proportionality. Furthermore, $\alpha$ is a tare removal correction value, which is specifically a correction value to subtract the weight of the feed tank 11 and perform other corrections, and it may be positive or negative. These coefficients of proportionality, K and K', are constants determined in advance such that a derivative of the result of expression (1), $W_1$, is the rate of change in weight of the pulverized fuel. In the present embodiment, the pressure in the feed tank 11 is detected as the pressure in the expansion/contraction part 71 as described above.

By differentiating expression (1) with respect to time, the rate of change in weight of the pulverized fuel can be obtained.

Alternatively, the rate of change in weight of the pulverized fuel may be obtained by adding the weight of the pulverized fuel in the feed tank 11 and the weight of the feed tank 11 and then differentiating the resultant value with respect to time. In this case, the weight of the feed tank 11 does not change as described above, and thus only the value for $\alpha$ in expression (1) changes. Consequently, obtaining the rate of change in weight of the pulverized fuel from the weight of the pulverized fuel in the feed tank 11 and obtaining the rate of change in weight of the pulverized fuel through the addition of the weight of the feed tank 11 and the weight of the pulverized fuel in the feed tank 11 arrive at an identical result.

Figure 5:
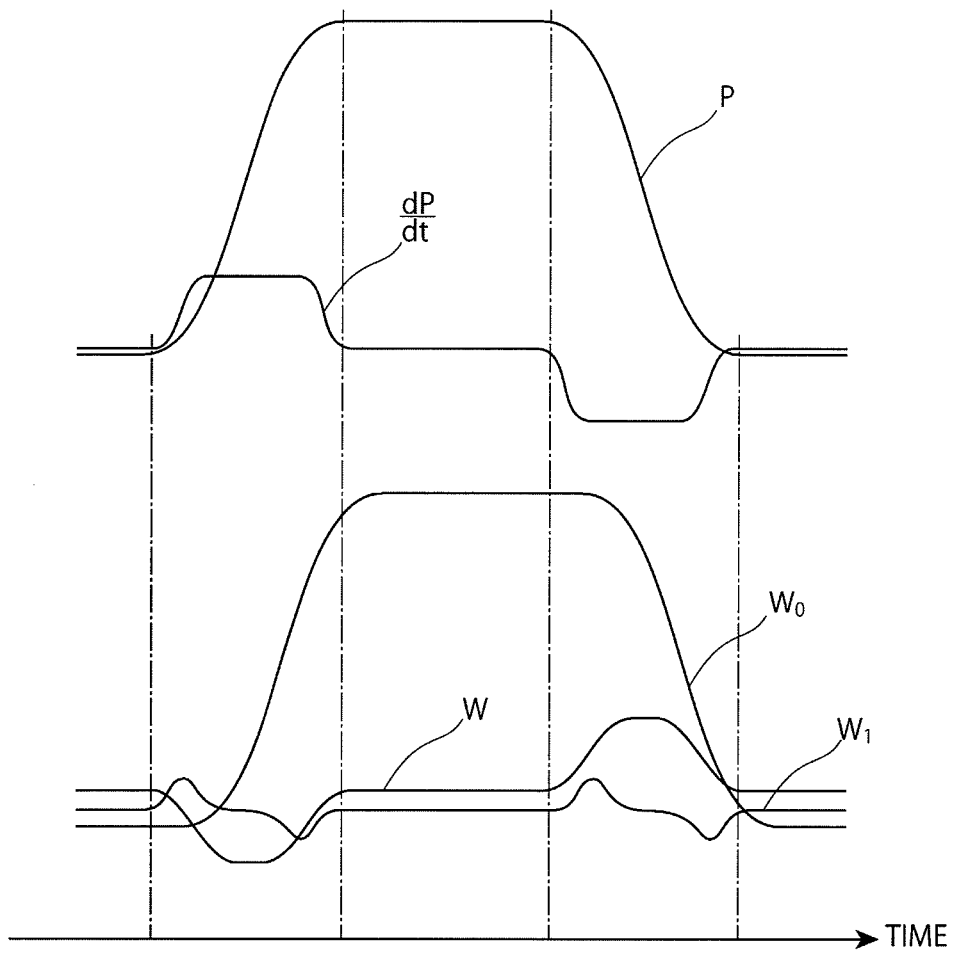
FIG. 5 is a graph of the weight of pulverized fuel obtained from a controller with the value of the powder flow rate at 0 and a pressure varied.

Whether the weight $W_1$ of the pulverized fuel in the feed tank 11 is obtained by expression (1) with a reduced error will now be described. FIG. 5 is a graph of the change in weight of the pulverized fuel obtained from the controller 60 with the value of the powder flow rate at 0 and the pressure varied. In FIG. 5, P represents, as with the description of expression (1), the change in pressure in the expansion/contraction part 71 (in pressure in the feed tank 11). The pressure P increases from an initial state, and then, after the elapse of a predetermined time, decreases. The pressure at the initial state and a final state is, for example, approximately 2 MPa, and the pressure at the peak is, for example, approximately 5 MPa.

In FIG. 5, $W_0$ represents, as with the description of expression (1), the load applied by the feed tank 11 to the load cell 45. The load $W_0$ applied by the feed tank 11 to the load cell 45 is a value received by the controller 60. The load $W_0$ changes with a predetermined time lag from the pressure P in the expansion/contraction part 71 because of the time taken from a change in pressure in the expansion/contraction part 71 to an expansion/contraction of the expansion/contraction part 71.

In addition, W represents the weight of the pulverized fuel output from the controller 60 with no consideration to the value proportional to the rate of change in pressure in the expansion/contraction part 71. In other words, W represents the weight of the pulverized fuel in a case in which the controller 60 performs the computation by using expression (2) below, which is expression (1) with K'(dP/dt) deleted.

$$W = W_0 - KAP + \alpha \quad (2)$$

As described above, the value of the powder flow rate is 0 in FIG. 5, and thus the weight of the pulverized fuel in the feed tank 11 does not change. As illustrated in FIG. 5, however, the weight W of the pulverized fuel, which is output by the controller 60 by using expression (2), falls as the pressure P in the expansion/contraction part 71 rises, and then returns to an original value soon after the rise of the pressure stops. Additionally, the weight W of the pulverized fuel rises as the pressure P in the expansion/contraction part 71 falls, and then returns to the original value as the rise of the pressure stops. The weight of the pulverized fuel, which is actually unchanged, changes significantly with the change in pressure in the expansion/contraction part 71 in the manner described above in the case in which the calculation is performed by using expression (2), which gives no consideration to the value proportional to the rate of change in pressure in the expansion/contraction part 71.

In FIG. 5, dP/dt represents the derivative of the pressure P in the expansion/contraction part 71 with respect to time. Reference figure $W_1$ represents the weight of the pulverized fuel output from the controller 60 with consideration to the value proportional to the rate of change in pressure in the expansion/contraction part 71. In other words, $W_1$ represents the weight of the pulverized fuel obtained with expression (1). Note that, in FIG. 5, W, $W_0$, and $W_1$ are plotted and vertically shifted to facilitate understanding, but this does not intend to indicate the magnitude of values thereof. In this case, the value of the powder flow rate is also at 0 as described above, and thus the weight of the pulverized fuel in the feed tank 11 does not change. As illustrated in FIG. 5, the weight $W_1$ of the pulverized fuel, which is obtained by adding a value proportional to dP/dt to W calculated by the controller 60 with expression (2), decreases slightly as the pressure in the expansion/contraction part 71 starts increasing, but the error is very small. Additionally, the weight $W_1$ of the pulverized fuel, which is output by the controller 60, increases slightly immediately before the pressure in the feed tank 11 stops increasing, but the error is very small. The weight $W_1$ of the pulverized fuel, which is output by the controller 60, also decreases slightly as the pressure in the expansion/contraction part 71 starts decreasing, but the error is very small. The weight $W_1$ of the pulverized fuel increases slightly immediately before the pressure in the expansion/contraction part 71 stops decreasing, but the error is very small. In this manner, by obtaining the weight of the pulverized fuel in the expansion/contraction part 71 with expression (1), the weight of the pulverized fuel can be obtained with improved accuracy with a small error even in a case in which the pressure in the expansion/contraction part 71 changes.

Here, the powder weight $W_1$ and the rate of change in powder weight $W_1$ obtained in calculation step S4 may be subjected to primary delay processing. In other words, a primary delay filter or a moving average filter may be provided in a computation diagram of the controller 60, and such a filter may be used. For example, in a case in which the primary delay processing is performed, a primary delay transfer function $G(s)=k/(1+Ts)$ may be applied to expression (1) as described in expression (3).

$$W_2 = \left(W_O - KAP + \alpha + K'\frac{dP}{dt}\right)\frac{k}{(1+Ts)} \quad (3)$$

In this expression, k is a gain constant, which may be defined as deemed appropriate such that the ratio of a mean value to a standard deviation of $W_2$ with respect to the time axis is within a predetermined range, whereas Ts is a next constant, which may be defined to, for example, 1 second to 3 seconds although its optimum value may differ with an environment in which the feed tank 11 is placed and the like. By performing such a calculation, a steep rise or fall of an error in powder weight can be alleviated to further reduce the error. Thus, the weight of the pulverized fuel can be calculated further accurately.

Figure 6:
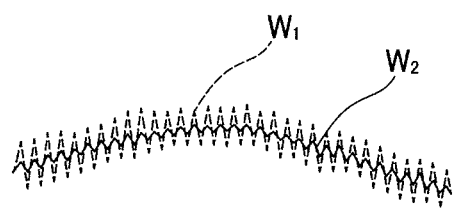
FIG. 6 is a graph of an error reduced for the detected powder weight.

FIG. 6 is a graph of the powder weight $W_1$ obtained through expression (1) with an error further reduced through expression (3). In FIG. 6 also, $W_2$ represents the weight of the pulverized fuel output by the controller 60 in the case in which expression (3) is used to obtain the weight of the pulverized fuel in the feed tank 11, and $W_1$ represents the weight of the pulverized fuel output by the controller 60 in the case in which expression (1) is used to obtain the weight of the pulverized fuel in the feed tank 11. In FIG. 6, $W_1$ is indicated with a dashed line to facilitate understanding. In FIG. 6, the value of the powder flow rate is 0, as with the condition in FIG. 5. In FIG. 6, the pressure is changed in a short time. As illustrated in FIG. 6, by obtaining the powder weight through expression (3), a smaller error of the powder weight can be restrained. As illustrated in FIG. 6, when the weight of the pulverized fuel in the feed tank 11 is obtained through expression (1), slight fluctuation is caused to the output of the weight $W_1$ of the pulverized fuel output by the controller 60. By obtaining the weight of the pulverized fuel in the feed tank 11 through expression (3), this fluctuation can be restrained, and thus the weight of the pulverized fuel can be obtained further accurately. By differentiating a result of the expression with respect to time, the rate of change in weight of the pulverized fuel can be obtained further accurately. To restrain such small fluctuation, next constant Ts and gain constant k in expression (3) may be adjusted. Although not particularly shown, the powder weight $W_1$ obtained through expression (1) in FIG. 6 has a reduced error in comparison with the powder weight W obtained through expression (2).

Although the primary delay processing has been described, moving average processing may be performed. To perform the moving average processing, the powder weight $W_1$ obtained through expression (1) may be subjected to the moving average processing, such as simple moving average processing and weighted moving average processing. Additionally, the powder weight $W_1$ and the rate of change in powder weight $W_1$ may be subjected to both the primary delay processing and the moving average processing. In this case, the sequence of the primary delay processing and the moving average processing is not particularly limited.

<Flow Rate Control Step S5>

When the powder weight $W_1$ (or the powder weight $W_2$) in the feed tank 11 and the rate of change in powder weight $W_1$ (or the powder weight $W_2$) are obtained in calculation step S4, the controller 60 generates a control signal on the basis of this result, by using, as needed, the information in the memory 60, a signal from the pressure indicator 43, a signal from the pressure indicator 49, and a signal from the powder flowmeter 40, and outputs this control signal to the internal pressure control valve indicator 42 and the powder valve indicator 41 to adjust the aperture of the internal pressure adjustment valve 22 and the valve 21 for powder. The flow rate of the pulverized fuel to be fed to the powder delivery pipe 31 is directly controlled by the aperture of the valve 21 for powder, and also, the differential pressure between the pressure in the carrier gas main pipe 33 and the pressure in the powder delivery pipe 31 is adjusted through the adjustment of the pressure in the feed tank 11, which is adjusted through the adjustment of the aperture of the internal pressure adjustment valve 22. This finely adjusts the flow rate of the pulverized fuel to be fed to the powder delivery pipe 31. Note that the differential pressure between the pressure in the feed tank 11 and the pressure in the carrier gas main pipe 33 or the differential pressure between the pressure in the feed tank 11 and the pressure in the powder delivery pipe 31 may be adjusted by adjusting the pressure in the feed tank 11 to finely adjust the amount of the pulverized fuel to be fed to the powder delivery pipe 31.

In this manner, the flow rate of the pulverized fuel to be fed from the feed tank 11 is controlled.

As described above, in the powder supply device according to the present embodiment, the rate of change in weight of the pulverized fuel in the feed tank 11 is obtained on the basis of a value obtained by subtracting the force with which the expansion/contraction part 71 pushes the feed tank 11 downward when the expansion/contraction part 71 expands due to its inner pressure and the force proportional to the rate of change in pressure in the expansion/contraction part 71 from the load applied by the feed tank 11 to the load cell 45, and thus the rate of change in weight of the pulverized fuel in the feed tank 11 can be obtained accurately even when the pressure in the expansion/contraction part 71 changes. The flow rate of the pulverized fuel to be fed to the outside of the feed tank 11 is controlled on the basis of the rate of change in weight of the pulverized fuel in the feed tank obtained accurately as described above, and thus the flow rate of the pulverized fuel to be fed can be controlled with improved accuracy.

Second Embodiment

Figure 7:
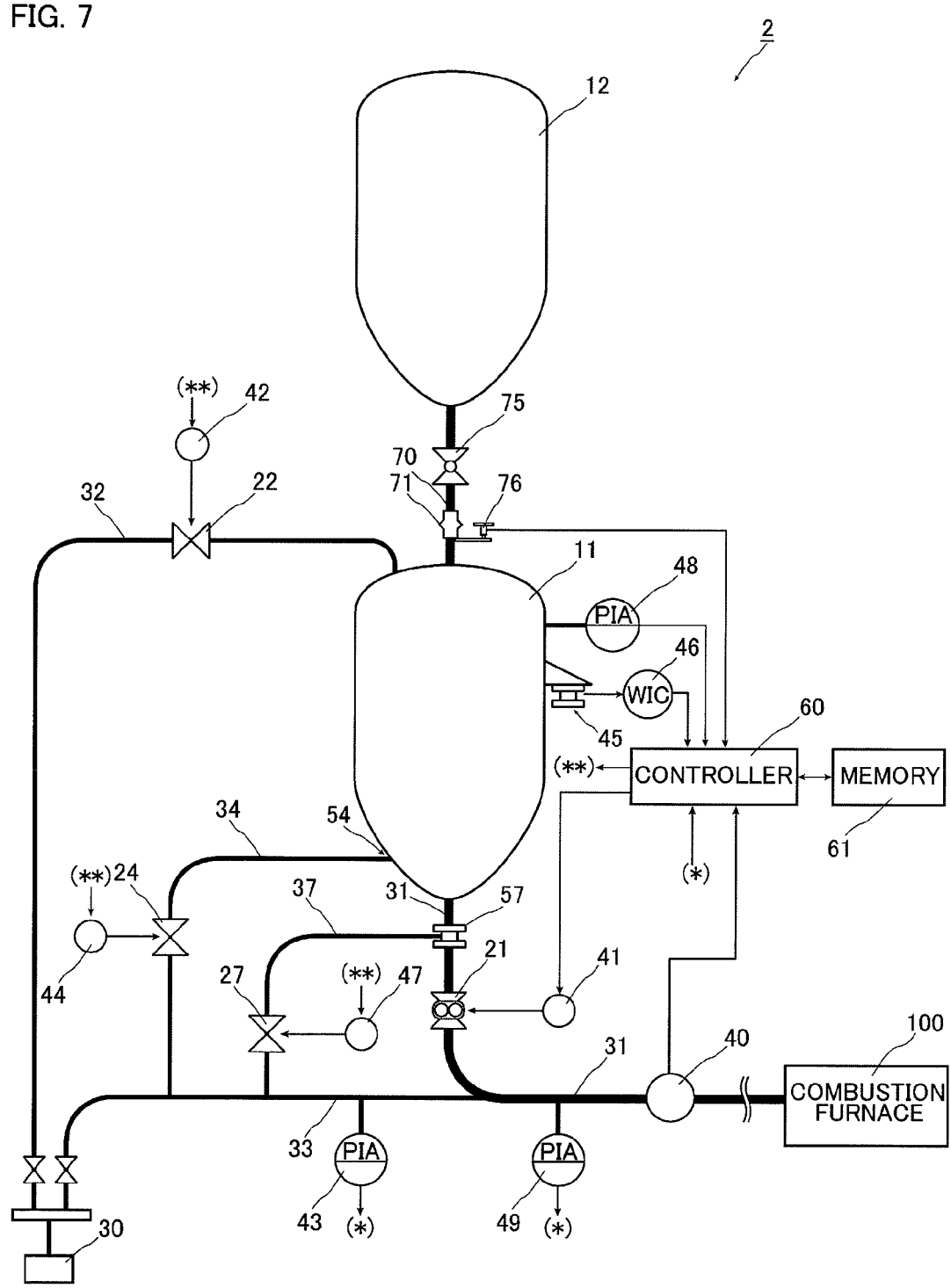
FIG. 7 is a diagram of a powder supply device according to a second embodiment of the present invention.

A second embodiment of the present invention will now be described with reference to FIG. 7. Components identical or similar to those in the first embodiment use identical reference figures and the description thereof is omitted unless specifically described.

A powder supply device 2 according to the present embodiment differs from the powder supply device 1 according to the first embodiment in that the powder supply device 2 includes a displacement gauge 76 for measuring the amount of expansion/contraction of an expansion/contraction part 71. The displacement gauge 76 detects the amount of expansion/contraction of the expansion/contraction part 76 by, for example, detecting how far a lower end of the expansion/contraction part 76 shifts from a reference position that is a position of the lower end of the expansion/contraction part 76 with no pulverized fuel charged in a feed tank 11. Examples of such a displacement gauge include a contact-type displacement sensor and an optical noncontact displacement sensor.

A signal containing the amount of expansion/contraction of the expansion/contraction part 71 detected by the displacement gauge 76 is input into a controller 60.

The powder supply device 2 described above performs an operation as below.

Feed step S1 and input step S2 are performed as with the operation of the powder supply device 1 of the first embodiment. Then, in reception step S3, in addition to the operation of reception step S3 in the first embodiment, the displacement gauge 76 detects the amount of expansion/contraction of the expansion/contraction part 71, and a signal containing information of the detected amount of expansion/contraction of the expansion/contraction part 71 is received by the controller 60.

Subsequently, in calculation step S4 in the present embodiment, the controller 60 obtains the rate of change in weight of the pulverized fuel in the feed tank 11 by using a value obtained by subtracting a value proportional to a pressure in the expansion/contraction part 71 detected by a pressure indicator 48 from the load applied by the feed tank 11 to a load cell 45, adding a value obtained by the subtraction to a value proportional to the rate of change in pressure in the expansion/contraction part 71, and subtracting a value proportional to the amount of expansion/contraction of the expansion/contraction part 71 and then the weight of the feed tank 11, etc. from a value obtained by the addition. Specifically, with the amount of expansion/contraction of the expansion/contraction part 71 detected by the displacement gauge 76 defined as B, the weight $W_3$ of the pulverized fuel may be described as in expression (4) below. In expression (4), K" is a negative constant determined in advance such that a derivative of a result of expression (4), $W_3$, is the rate of change in weight of the pulverized fuel.

$$W_3 = W_O - KAP + \alpha + K'\frac{dP}{dt} - K''B \tag{4}$$

In other words, calculation step S4 in the present embodiment differs from calculation step S4 in the first embodiment in that the powder weight $W_3$ is obtained by subtracting the value proportional to the amount of expansion/contraction of the expansion/contraction part 71 from expression (1) calculated in calculation step S4 in the first embodiment.

Then, by differentiating expression (4) with respect to time, the rate of change in weight of the pulverized fuel can be obtained. Note that, also in the present embodiment, the rate of change in weight of the pulverized fuel may be obtained by adding the weight of the pulverized fuel in the feed tank 11 and the weight of the feed tank 11 and then differentiating a resultant value with respect to time.

Additionally, also in the present embodiment, the powder weight $W_3$ obtained through the expression described above and the rate of change in powder weight may be subjected to at least one of the primary delay processing and the moving average processing. In this case, the powder weight and the rate of change in powder weight can be obtained further accurately.

Then, flow rate control step S5 is performed as with the first embodiment. In this manner, the flow rate of the pulverized fuel to be fed from the feed tank 11 is controlled.

In the present embodiment, by subtracting the value proportional to the amount of expansion/contraction of the expansion/contraction part 71, influence of expansion of the expansion/contraction part 71 due to heat and the like can be eliminated, and thus the powder weight and the rate of change in powder weight can be obtained with improved accuracy. Consequently, the flow rate of the powder to be fed can be controlled with improved accuracy.

While the present invention has been described above with reference to some embodiments as examples, the present invention is not limited thereto.

Although the pressure in the feed tank 11 is detected by the pressure indicator 48 to use a resultant pressure as the pressure in the expansion/contraction part 71 in the embodiments described above, pressure indicators may be provided before and after the expansion/contraction part 71 on the powder feed pipe 70 to directly detect the pressure in the expansion/contraction part 71 and input a signal containing information on a resultant pressure into the controller 60.

Furthermore, although the valve 21 for powder and the refluidizing portion 57 are provided in the middle portions of the powder delivery pipe 31 in the embodiments described above, the present invention is not limited thereto. For example, the valve 21 for powder and the refluidizing portion 57 may be connected directly to each other, such that the valve 21 for powder is connected to an end of the powder delivery pipe 31 and the refluidizing portion 57 is connected to the bottom portion of the feed tank 11. In this case, the powder delivery pipe 31 is indirectly connected to the feed tank 11.

Furthermore, although the flow rate of the pulverized fuel to be fed to the outside of the feed tank 11 is controlled by using the rate of change in weight of the pulverized fuel in the feed tank in the embodiments described above, it may be controlled by using the weight of the pulverized fuel.

Furthermore, although the powder supply device for supplying powder that is pulverized fuel, such as pulverized coal, has been described in the embodiments described above, the present invention is not limited thereto and can be applied to a powder supply device for supplying powder other than the pulverized fuel.

Furthermore, the pulverized fuel in the feed tank is fluidize by the fluidizing gas and further refluidized in the powder delivery pipe 31 in the embodiments described above, the fluidizing and refluidizing of the pulverized fuel are not essential.

INDUSTRIAL APPLICABILITY

As described above, in the present invention, a powder supply device and a powder supply method capable of controlling, with improved accuracy, the flow rate of powder to be fed are provided, and such a powder supply device and a powder supply method can be used to supply pulverized fuel in an energy plant, a blast furnace plant, and the like and to supply powder in a plant manufacturing food materials using powder.

REFERENCE SIGNS LIST

1 . . . powder supply device
11 . . . feed tank
12 . . . pressure equalizing tank
21 . . . valve for powder
22 . . . internal pressure control valve
24 . . . fluidizing gas valve
27 . . . refluidizing gas valve
30 . . . gas generator
31 . . . powder delivery pipe
32 . . . internal pressure gas supply pipe
33 . . . carrier gas main pipe
34 . . . fluidizing gas pipe
37 . . . refluidizing gas pipe
40 . . . powder flowmeter
41 . . . powder valve indicator
42 . . . internal pressure control valve indicator
43 . . . pressure indicator
44 . . . fluidizing gas valve indicator
45 . . . load cell
46 . . . weight indicator/controller
47 . . . refluidizing gas valve indicator
48 . . . pressure indicator
49 . . . pressure indicator
54 . . . powder fluidizing portion
57 . . . powder refluidizing portion
60 . . . controller
61 . . . memory
70 . . . powder feed pipe
71 . . . expansion/contraction part
71a . . . large diameter portion
71b . . . small diameter portion
73 . . . ring
75 . . . powder feed valve
76 . . . displacement gauge
100 . . . combustion furnace

The invention claimed is:

1. A powder supply device for supplying powder in a feed tank to an outside of the feed tank, the device comprising:
a powder feed pipe, at least part of which is an expansion/contraction part that expands and contracts in a vertical direction, the powder feed pipe being provided with a powder feed valve and being connected to a top portion of the feed tank and configured to feed the powder into the feed tank;
a load cell configured to detect a load from the feed tank;
a pressure indicator configured to detect a pressure in the expansion/contraction part; and
a controller,
wherein the controller calculates a powder weight or a rate of change in powder weight in the feed tank by using a value obtained by performing a subtraction of a value proportional to the pressure in the expansion/contraction part detected by the pressure indicator from the load detected by the load cell and an addition of a value proportional to a rate of change in pressure in the expansion/contraction part, and
wherein the controller controls a flow rate of the powder to be fed to the outside of the feed tank by using the calculated powder weight or the rate of change in powder weight.

2. The powder supply device according to claim 1, further comprising a displacement gauge configured to detect an amount of expansion/contraction of the expansion/contraction part,
wherein the controller calculates the powder weight or the rate of change in powder weight in the feed tank by also subtracting a value proportional to the amount of expansion/contraction.

3. The powder supply device according to claim 1, wherein the controller utilizes at least one of primary delay processing and moving average processing.

4. The powder supply device according to claim 1, wherein the pressure indicator detects a pressure in the feed tank which is indicative of the pressure in the expansion/contraction part.

5. The powder supply device according to claim 1, further comprising a displacement gauge configured to detect an amount of expansion/contraction of the expansion/contraction part and communicating with the controller.

6. The powder supply device according to claim 5, wherein the controller is configured to calculate the rate of change in powder weight in the feed tank based also on subtracting a value proportional to the amount of expansion/contraction.

7. A powder supply device for supplying powder in a feed tank to an outside of the feed tank, the device comprising:
a powder feed pipe;
a powder feed valve coupled to the powder feed pipe;
an expansion/contraction part that expands and contracts in a vertical direction arranged above a top portion of the feed tank and through which powder is fed before entering into the feed tank;
a load cell coupled to the feed tank;
a pressure indicator configured to detect a pressure in the expansion/contraction part; and
a controller configured to calculate a rate of change in powder weight in the feed tank based on:

subtracting a value proportional to the detected pressure in the expansion/contraction part from a load detected by the load cell; and adding a value proportional to a rate of change in pressure in the expansion/contraction part, and wherein the controller controls a flow rate of the powder to be fed to the outside of the feed tank by using the calculated rate of change in powder weight.

8. The powder supply device according to claim 7, further comprising a displacement gauge configured to detect an amount of expansion/contraction of the expansion/contraction part.

9. The powder supply device according to claim 8, wherein the controller is configured to calculate a powder weight or a rate of change in powder weight in the feed tank based also on subtracting a value proportional to the amount of expansion/contraction.

10. The powder supply device according to claim 7, wherein the pressure indicator detects a pressure in the feed tank which is indicative of the pressure in the expansion/contraction part.

* * * * *